United States Patent
Davis et al.

(10) Patent No.: US 8,767,944 B1
(45) Date of Patent: Jul. 1, 2014

(54) MECHANISM FOR STATUS AND CONTROL COMMUNICATION OVER SIP USING CODEC TUNNELING

(75) Inventors: Sheldon Davis, Union City, CA (US); Robert Steiner, Broomfield, CO (US)

(73) Assignee: Avaya Inc., Basking Ridge, NJ (US)

(*) Notice: Subject to any disclaimer, the term of this patent is extended or adjusted under 35 U.S.C. 154(b) by 1341 days.

(21) Appl. No.: 11/619,504

(22) Filed: Jan. 3, 2007

(51) Int. Cl.
H04M 3/00 (2006.01)
H04M 3/523 (2006.01)
H04L 29/06 (2006.01)

(52) U.S. Cl.
CPC ........... *H04M 3/5237* (2013.01); *H04L 65/608* (2013.01)
USPC .................................................... 379/265.09

(58) Field of Classification Search
CPC ............................ H04M 3/5327; H04L 65/608
USPC ............. 379/265.02, 266.04, 265.03, 265.09; 709/217–219, 231
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,329,579 A | 7/1994 | Brunson | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |

(Continued)

FOREIGN PATENT DOCUMENTS

| | | |
|---|---|---|
| CA | 2143198 | 1/1995 |
| CA | 2174762 | 6/1995 |

(Continued)

OTHER PUBLICATIONS

U.S. Appl. No. 12/239,120, filed Sep. 26, 2008, Steiner et al.

(Continued)

*Primary Examiner* — Sonia Gay
(74) *Attorney, Agent, or Firm* — Sheridan Ross P.C.

(57) ABSTRACT

A distributed contact center and method of managing data transfers between the distributed parts of the contact center is provided. Distributed parts of the contact center are joined together through a known communications initiation protocol such as SIP, then status information and/or control signals are transferred between the distributed parts using lossless communication protocols.

26 Claims, 7 Drawing Sheets

(56) References Cited

U.S. PATENT DOCUMENTS

| | | |
|---|---|---|
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,704,409 B1 | 3/2004 | Dilip et al. |
| 6,707,903 B2 | 3/2004 | Burok et al. |
| 6,744,877 B1 | 6/2004 | Edwards |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,785,380 B2 | 8/2004 | Ribera |
| 7,035,808 B1 | 4/2006 | Ford |
| 7,200,219 B1 | 4/2007 | Edwards et al. |
| 7,417,989 B1 | 8/2008 | Doran |
| 7,444,139 B1 | 10/2008 | Welch et al. |
| 7,574,736 B2 * | 8/2009 | Salapaka et al. .................. 726/13 |
| 2001/0056349 A1 | 12/2001 | St. John |
| 2002/0002460 A1 | 1/2002 | Pertrushin |
| 2002/0002464 A1 | 1/2002 | Pertrushin |
| 2002/0010587 A1 | 1/2002 | Pertrushin |
| 2002/0072618 A1 | 6/2002 | Afzali-Ardakani et al. |
| 2002/0118816 A1 | 8/2002 | Flockhart et al. |
| 2002/0178273 A1 | 11/2002 | Pardo-Castellote et al. |

(56) References Cited

U.S. PATENT DOCUMENTS

| | | |
|---|---|---|
| 2002/0181692 A1 | 12/2002 | Flockhart et al. |
| 2002/0194002 A1 | 12/2002 | Petrushin |
| 2003/0093465 A1 | 5/2003 | Banerjee et al. |
| 2003/0120789 A1 | 6/2003 | Hepworth et al. |
| 2003/0123642 A1 | 7/2003 | Alvarado et al. |
| 2003/0152212 A1 | 8/2003 | Burok et al. |
| 2003/0174830 A1 | 9/2003 | Boyer et al. |
| 2003/0177017 A1 | 9/2003 | Boyer et al. |
| 2003/0177231 A1 | 9/2003 | Flockhart et al. |
| 2004/0003046 A1 | 1/2004 | Grabelsky et al. |
| 2004/0203878 A1 | 10/2004 | Thomson |
| 2005/0068907 A1 | 3/2005 | Garg et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2006/0015388 A1 | 1/2006 | Flockhart et al. |
| 2006/0098625 A1 | 5/2006 | King et al. |
| 2006/0126816 A1 | 6/2006 | Shaffer et al. |
| 2006/0173921 A1* | 8/2006 | Jalonen .................... 707/200 |
| 2006/0221941 A1 | 10/2006 | Kishinsky et al. |
| 2006/0245391 A1 | 11/2006 | Vaidya et al. |
| 2007/0072618 A1 | 3/2007 | Freytsis et al. |
| 2007/0140465 A1 | 6/2007 | Erhart et al. |
| 2007/0263787 A1 | 11/2007 | Dong et al. |
| 2007/0276937 A1 | 11/2007 | Chavda et al. |
| 2007/0299680 A1* | 12/2007 | Fama et al. .................. 705/1 |
| 2008/0084831 A1 | 4/2008 | Sylvain |
| 2009/0003549 A1 | 1/2009 | Baird et al. |
| 2009/0238359 A1 | 9/2009 | Ely et al. |
| 2009/0279436 A1 | 11/2009 | Chin et al. |

FOREIGN PATENT DOCUMENTS

| | | |
|---|---|---|
| DE | 102006031080 | 1/2008 |
| EP | 0501189 A2 | 9/1992 |
| EP | 0740450 A2 | 10/1996 |
| EP | 0772335 A2 | 5/1997 |
| EP | 0855826 A2 | 7/1998 |
| EP | 0829996 A2 | 9/1998 |
| EP | 0863651 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| EP | 1643743 | 4/2006 |
| GB | 2273418 | 6/1994 |
| GB | 2290192 A | 12/1995 |
| SE | 9801074 | 12/1998 |
| WO | 9607141 | 3/1996 |
| WO | 9728635 | 8/1997 |
| WO | WO 98/56207 | 12/1998 |

OTHER PUBLICATIONS

U.S. Appl. No. 12/469,523, filed May 20, 2009, Steiner.
U.S. Appl. No. 12/545,386, filed Aug. 21, 2009, Flockhart et al.
U.S. Appl. No. 12/564,831, filed Sep. 21, 2009, Flockhart et al.
"The Dynamic Data Center", The Burton Group, Jun. 11, 2008, pp. 1-30.
Definity Communications System Generic 3 Call Vectoring/Expert Agent Selection (EAS) Guide, AT&T publication No. 555-230-520 (Issue 4, Sep. 1995).
Hill, "Contact Center on Demand: An opportunity for telcos to be leaders in the grid-computing revolution," Telephony Online, Jul. 2, 2003, pp. 1-5.
"Domain Name Services," available at http://www.pism.com/chapt09/chapt09.html, downloaded Mar. 31, 2003, 21 pages.
Bellsouth Corp., "Frequently Asked Questions—What is a registrar?," available at https://registration.bellsouth.net/NASApp/DNSWebUI/Faq.jsp, downloaded Mar. 31, 2003, 4 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Coles, Scott, "A Guide for Ensuring Service Quality in IP Voice Networks," Avaya, Inc., 2002, pp. 1-17.
Foster, Robin, et al., "Avaya Business Advocate and its Relationship to Multi-Site Load Balancing Applications," Avaya, Inc., Mar. 2002, 14 pages.
Avaya, Inc., "Voice Over IP Via Virtual Private Networks: An Overview," Avaya, Inc., Feb. 2001, 9 pages.
Avaya, Inc., "Better Implementation of IP in Large Networks," Avaya, Inc. 2002, 14 pages.
CentreVu Advocate Release 9 User Guide, Avaya Inc., 585-215-953, Issue 1 (Dec. 2000), pp. 1-210.
"The Advantages of Load Balancing in the Multi-Call Center Enterprise," Avaya Inc. White Paper (Feb. 2002), pp. 1-13.
"Internet Protocol Addressing," available at http://samspade.org/d/ipdns.html, downloaded Mar. 31, 2003, 9 pages.
David Chavez et al., "Avaya MultiVantage Software: Adapting Proven Call Processing for the Transition to Converged IP Networks," Avaya Inc. White Paper (Aug. 2002), pp. 1-20.
Doo-Hyun Kim et al. "Collaborative Multimedia Middleware Architecture and Advanced Internet Call Center," Proceedings at the International Conference on Information Networking (Jan. 31, 2001), pp. 246-250.
"When Talk Isn't Cheap," Sm@rt Reseller, v. 3, n. 13 (Apr. 3, 2000), p. 50.
"eGain's Commerce 2000 Platform Sets New Standard for eCommerce Customer Communications," Business Wire (Nov. 15, 1999)., 3 pages.
Dawson, "NPRI's Powerguide, Software Overview" Call Center Magazine (Jun. 1993), p. 85.
"Applications, NPRI's Predictive Dialing Package," Computer Technology (Fall 1993), p. 86.
"Call Center Software You Can't Outgrow," Telemarketing® (Jul. 1993), p. 105.
"VAST™, Voicelink Application Software for Teleservicing®," System Manager User's Guide, Digital Systems (1994), pp. ii, vii-ix, 1-2, 2-41 through 2-77.
Geotel Communications Corporation Web site printout entitled "Intelligent CallRouter Call Flow", 1998.
L.F. Lamel and J.L. Gauvain, Language Identification Using Phone-Based Acoustic Likelihood, ICASSP-94, 4 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-32.
Levent M. Arsian, Foreign Accent Classification in American English, Department of Electrical Computer Engineering, Duke University, Thesis, pp. 1-218 (1996).
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 16 pages.
Presentation by Victor Zue, The MIT Ox90ygen Project, MIT Laboratory for Computer Science (Apr. 25-26, 2000) 9 pages.
MIT Project Oxygen, Pervasive, Human-Centered Computing (MIT Laboratory for Computer Science) (Jun. 2000) pp. 1-15.
Examiner's Refusal Decision dated Jul. 4, 2005 in Japanese Patent App. No. 2000-34266.
Examiner's Refusal Decision for Japanese Patent Application No. 2000-34267 dated Mar. 9, 2005 with translation, 4 pages.
Avaya, Inc. Business Advocate Product Summary, at http://www.avaya.com, downloaded on Feb. 15, 2003, Avaya, Inc. 2003, 3 pages.
Avaya, Inc. Business Advocate Options, at http://www.avaya.com, downloaded on Feb. 15, 2013, Avaya, Inc. 2003.

(56) References Cited

OTHER PUBLICATIONS

Avaya, Inc. CentreVu Advocate, Release 9, User Guide, Dec. 2000.
Douglas W. Stevenson et al., "Name Resolution in Network and Systems Management Environments," available at http://netman.cit.buffalo.edu/Doc/DStevenson/NR-NMSE.html, downloaded Mar. 31, 2003, 16 pages.
"Product Features," Guide to Call Center Automation, CRC Information Systems, Inc., Tel-ATHENA, Section 5—Company C520, p. 95, 1992.
Official Action for U.S. Appl. No. 12/239,120, mailed Jul. 27, 2011.
Notice of Allowance for U.S. Appl. No. 12/239,120, mailed Nov. 10, 2011.
Examination Report for United Kingdom Patent Application No. GB0823696, dated Jan. 31, 2012 2 pages.
Official Action for U.S. Appl. No. 12/239,120, mailed May 26, 2010.
Official Action for U.S. Appl. No. 12/239,120, mailed Nov. 5, 2010.
Official Action for U.S. Appl. No. 12/239,120, mailed Feb. 25, 2011.
Official Action for German Patent Application No. DE 102008062982.0-31, dated Jul. 3, 2009.
Search Report for Patent Application No. GB0823696.0, dated Apr. 7, 2009.

* cited by examiner

MECHANISM FOR STATUS AND CONTROL COMMUNICATION OVER SIP USING CODEC TUNNELING

FIELD

The present invention is directed generally to distributed contact centers and more specifically to the transfer of status information and control signals between different sites in a distributed contact center.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Originally, contact centers were designed as single site operations. In other words, all of the contact center resources such as servers, agents, managers, and the like were located at a single site. A single site contact center was relatively easy to manage because all of the resources were essentially in a common environment. When an agent became available, the server controlling workflow was apprised of the availability almost instantly and could monitor the contact and agent queues in real-time.

As businesses become global and contact center job outsourcing becomes a viable option to many companies, contact centers are beginning to grow into multiple site operations. The resources for a contact center may be redundantly provided at each site such that every site can operate autonomously and communication between sites is not a requirement for operation. However, providing fully redundant contact center sites can become costly when the only additional resource really required is contact center agents. For this reason, many multiple site contact centers share resources. For example, one site may have all of the resources to be a complete contact center, whereas another site only has contact center agents or other resources with specific skills. The complete contact center receives all incoming contacts and routes the contacts to the other site having only agents or specialized resources. Under this scenario, contact center agent status information has to be relayed from the remote site to the ACD at the complete contact center. In fact, it is often the case in multiple site call centers that large amounts of information about the agents, skills (services), queues, and other status information needs to be transmitted between sites. An example of such a geographically distributed call center is described in US Patent Application No. 20060067506 to Flockhart et al., the entire disclosure of which is hereby incorporated herein by reference.

Current solutions use preconfigured sockets or broadcasts to send data between sites. In the preconfigured sockets case, the setup of connections require implementation of either a discovery mechanism to find the other sites or requires special configuration parameters. Since firewalls are typically employed as a protection mechanism at each site, the contact center is required to either open ports or a communication protocol is forced to HTTP/SOAP or some other inefficient text based communication protocol. In the case of broadcasts no discovery mechanism is required, but the data update rate must be metered to keep the network from being flooded. This is not a desirable communication mechanism for most call centers and enterprises employing such call centers because it requires them to allow open, unsecured broadcasts which may raise security issues and is not practical over the public Internet.

SUMMARY

These and other needs are addressed by the various embodiments and configurations of the present invention. The present invention is directed generally to the transfer of status information using a communication protocol such as a Real-time Transport Protocol (RTP).

In one embodiment, a method is provided that includes the steps of:

(a) connecting two endpoints together;

(b) establishing a Real-Time Protocol (RTP) stream between the two endpoints; and (c) transferring status information and/or control signals from a first endpoint to a second endpoint using the RTP stream.

RTP has traditionally been used as a media transportation protocol. Specifically, RTP has been used to transfer streaming audio and video files over the Internet or the like. However, in accordance with embodiments of the present invention, RTP is used to transfer status information and/or control signals between endpoints. The status information and/or control signals are inserted in the RTP header, payload, or trailer and sent as binary data. On the receiving end the payloads of all RTP packets representing the transferred status information are reassembled and analyzed to help determine how to manage the endpoint based on the status information. After a control signal is reassembled it is sent to the appropriate resource to execute the commands included in the control signal.

In one embodiment, the endpoints correspond to contact center sites. The status information passed between sites using RTP may include agent information, queue information, skill information, contact center performance information, network information, system information, process flow information, control information, and server status information. This information can be used to determine how to allocate and distribute the incoming workload. In other words, the status information can be used to determine what control signals should be sent between sites. For instance, an ACD at one site can transfer a received contact to another site when it is determined that the other site has an available agent. Additionally, control signals can be used to adjust contact assignment criteria at one site if it is determined that contact volume at another site has changed.

The RTP communications may be initially set up through the use of Session Initiation Protocol (SIP). SIP provides a known protocol for setting up communication sessions and can also be used to negotiate codecs between the endpoints. Moreover, SIP has the ability to go through firewalls and provides for encryption. Therefore, security issues do not have to be addressed as they did with the broadcast solution of the prior art.

In one embodiment, a lossless codec is employed to transfer data between endpoints. The codec is preferably lossless because status information and control signals should be received as a whole rather than in pieces. If only portions of the status information or control signals were received then problems may arise. Since contact distribution decisions have to be made based on the status information, in one embodiment, the accuracy of that information should be maintained. Also, since control signals should be precisely followed, it is important to maintain the integrity and accuracy of the control signals.

An RTP packet and header structure as well as the Real-time Transport Control Protocol (RTCP) is described more fully in US Patent Application No. 20030120789 to Hepworth et al., the entire disclosure of which is hereby incorporated by reference. Although embodiments of the invention are described in connection with the use of RTP, it can be appreciated by one of skill in the art that a similar media transport protocol may be employed. Accordingly, as used herein "RTP" is understood to include any standardized or non-standardized packet format for delivering audio and/or video information over a packet switched network. Allowable protocols may include any multicast and/or unicast protocols used in streaming media systems. The protocols may be designed for real-time applications like RTP or they may be designed for non-real-time application. Moreover, RTP as discussed herein can include any past, present, or future version of RTP including those versions and derivatives of RTP not yet contemplated.

As can be appreciated by one of skill in the art, a contact is understood herein to include voice calls, mails, chat, video calls, fax, Instant Messages (IMs), conferences, and combinations thereof. Accordingly, a contact center may be equipped to handle any one or a number of the above-noted contact types.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact processing switch, the invention is not limited to any particular type of communication system switch or configuration of system elements. Those skilled in the art will recognize that the disclosed techniques may be used in any communication application in which it is desirable to transport status information and/or control signals between endpoints using a secure and reliable communication protocol.

Figure 1:
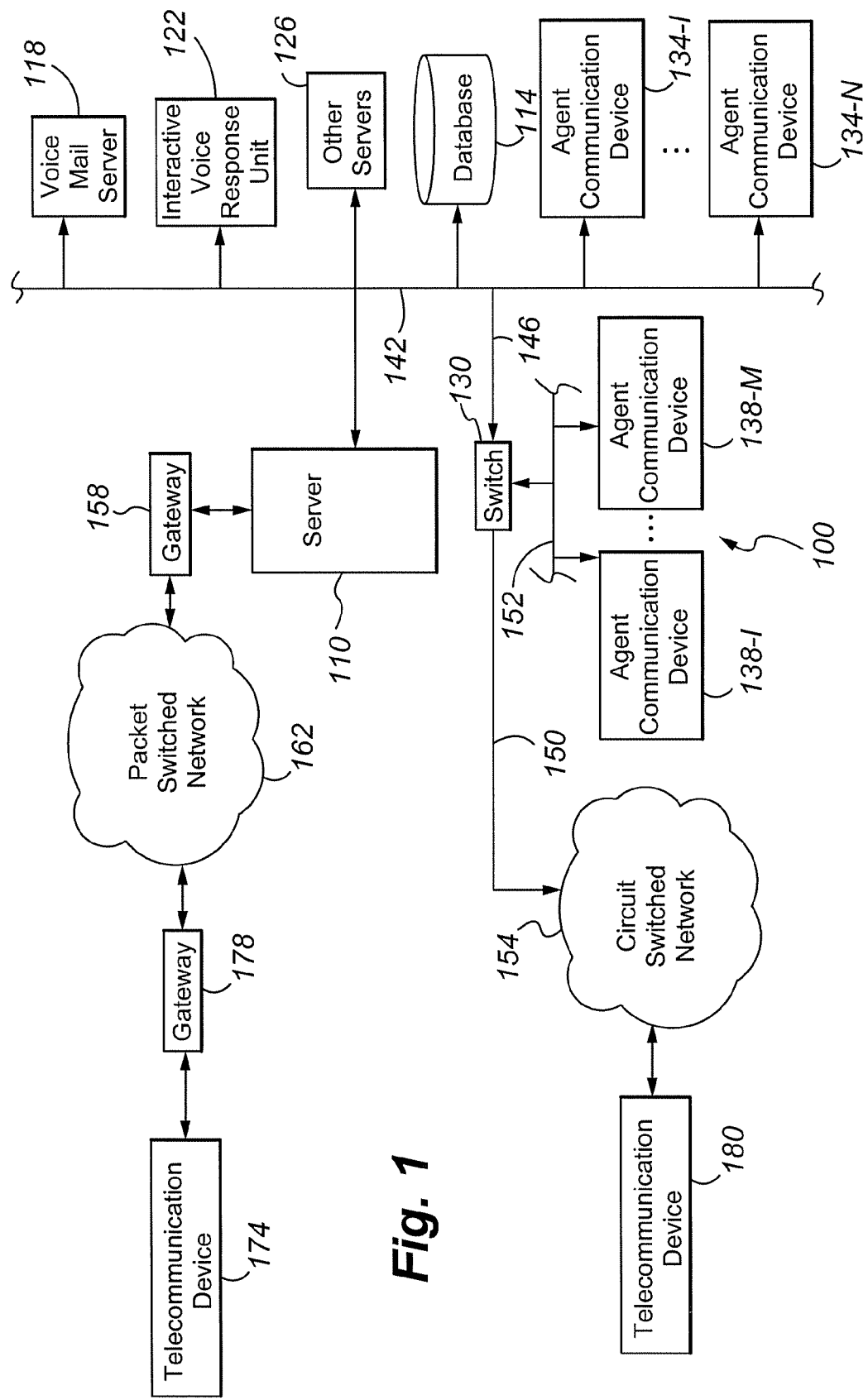
FIG. 1 is a block diagram depicting components of a contact center in accordance with embodiments of the present invention.

FIG. 1 shows an illustrative embodiment of a single site contact center according to embodiments of the present invention. A contact center 100 traditionally comprises a central server 110, a set of data stores or databases 114 containing contact or customer related information and other information that can enhance the value and efficiency of the contact processing, and a plurality of servers, namely a voice mail server 118, an Interactive Voice Response unit or IVR. 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
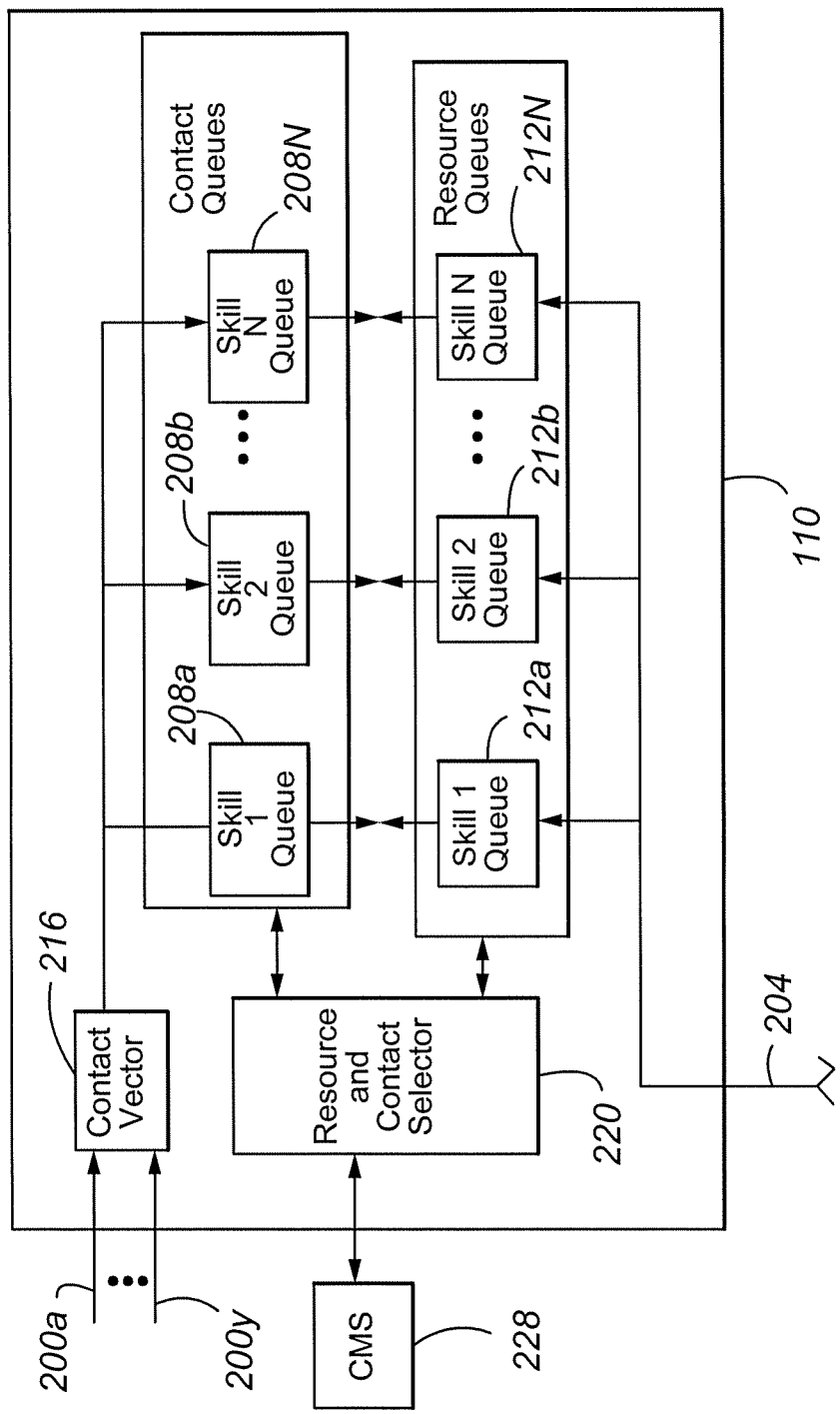
FIG. 2 is a block diagram depicting a contact center server in accordance with embodiments of the present invention.

Referring to FIG. 2, one possible configuration of the server 110 is depicted. This particular configuration is known as a skill based configuration. As can be appreciated by one of skill in the art, other configurations may be employed. Examples of other contact center configurations include, without limitation, rule based contact centers, advocate contact centers, and the like. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Call Management System™ or CMS 228 that gathers call records and contact-center statistics for use in generating contact-center reports. CMS 228 and any other reporting system, such as a Basic Call Management System™, Operational Analyst™ or Customer Call Routing or CCR™ will hereinafter be referred to jointly as CMS 228.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, SIP Enabled Services™, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

As can be seen in FIG. 2, included among the data stored in the server 110 is a set of contact queues 208a-n and a separate set of resource queues 212a-n. Each contact queue 208a-n corresponds to a different set of resource queues, as does each resource queue 212a-n. Conventionally, contacts are prioritized and either are enqueued in individual ones of the contact queues 208a-n in their order of priority or are enqueued in different ones of a plurality of contact queues that correspond to a different priority. Likewise, each resource's queues are prioritized according to the level of expertise in that queue, and either resources are enqueued in individual ones of resource queues 212a-n in their order of expertise level or are enqueued in different ones of a plurality of resource queues 212a-n that correspond to a queue and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the resource skill that is required for the proper handling of the contact. Resources that are available for handling contacts are assigned to resource queues 212a-n based upon the skills that they possess. A resource may have multiple skills, and hence may be assigned to multiple resource queues 212a-n simultaneously. Furthermore, a resource may have different levels of skill expertise (e.g., skill levels 1-N in one configuration or merely primary skill levels and secondary skill levels in another configuration), and hence may be assigned to different resource queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In a preferred configuration, the server 110, network 162, and first communication devices 134 are Session Initiation Protocol (SIP) compatible and can include interfaces for various other protocols such as the Lightweight Directory Access Protocol or LDAP, H.248, H.323, RTP, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should riot be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the component to forward or route the contact to a specific contact center resource, such as the IVR unit 122, the voice mail server 118, and/or first or second communication device 134, 138 associated with a selected agent. The server 110 distributes and connects these contacts to communication devices of available resources based on the predetermined criteria noted above. If the central server 110 forwards a voice contact to an agent, the central server 110 also forwards customer-related information from databases 114 to the agent's computer work station for previewing and/or viewing (such as by a pop-up display) to permit the agent to better serve the customer. The agent then processes the contacts sent to him/her by the central server 110.

Figure 3:
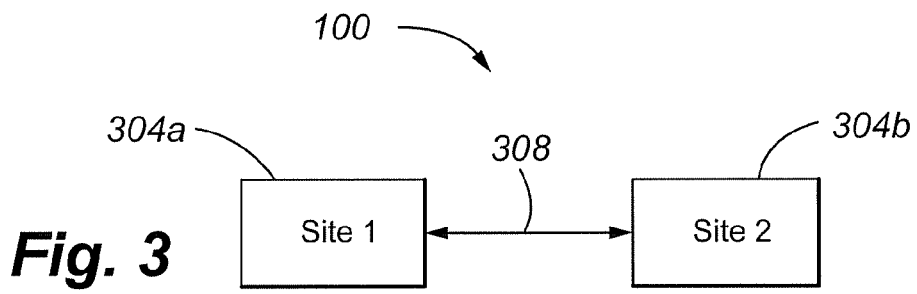
FIG. 3 is a block diagram depicting a simple multiple site contact center in accordance with embodiments of the present invention.

Referring now to FIG. 3, a simple multiple site contact center 100 will be described in accordance with at least some embodiments of the present invention. The contact center 100 may include a first site 304a and a second site 304b. The sites 304 are connected by a communication network 308. The connection 308 may be implemented through the packet switched network 162. As noted above, each site 304 may include all of the resources discussed in connection with FIG. 1. Alternatively, one of the sites 304 may include a portion of the resources and the other site 304 may include all other resources such that the combination of each site's 304 resources constitutes a fully functioning contact center 100. In still another alternative embodiment, one site 304 may include all of the resource described in connection with FIG. 1, and the other site may only include a subset of the resources in a complete contact center.

The first site 304a and the second site 304b may wish to share status information and/or control signals between one another via the connection 308. The connection 308 may be unidirectional but is typically a bidirectional connection as depicted. The sites 304 may find each other on the communication network 164 and establish their connection using known SIP messages. Once connected, the sites 304 may establish a RTP stream between one another. Once the RTP stream is established, the sites 304 may send status information and/or control signals back and forth. The type of status information transmitted between sites 304 may vary depending upon the resources in each site. For example, if the first site 304a strictly has agents and the second site 304b has the ACD resources, then the first site 304a may need to send agent state information to the second site 304b. Examples of resource state information include, but are not limited to, AVAILABLE, BUSY, AUXILIARY, LOGGED OUT, and AFTER CALL WORK (ACW). Alternatively, if both sites 304 have ACD resources and contacts are routed between sites, then the sites 304 may share status information such as queue information, skill information, server information, network information (e.g., available bandwidth, packet loss, jitter, etc.), system information, process flow information, control information, and other contact center status information. The control signals that are sent may vary depending upon the type of status information received. The control signals may be instructions to various resources within the contact center to perform one or more tasks such as transferring a contact, putting a contact on hold, and so on.

The status information and/or control signals are generally sent using a lossless codec such as a Free Lossless Audio Codec (FLAC), other custom codecs, or the like. Since SIP has encryption, the ability to go through firewalls, and the ability to negotiate a codec for the RTP stream, SIP is very useful for establishing the connection 308 between the first 304a and second 304b site. However, as can be appreciated by one of skill in the art, SIP is not the only protocol that may be employed to initiate the communications between the sites 304. Other known contact initiation protocols such as placing a VoIP call may be employed to connect the sites 304.

RTP defines a standardized packet format for delivering audio and video data over a packet switched network 164. RTP is built on top of the User Datagram Protocol (UDP). However, the RTP packet can't be transferred as it is over the packet switched network 164. UDP is used for transferring the RTP packet along with its payload. To transfer the UDP packet over the packet switched network 164, the UDP packet needs to be encapsulated with an IP packet. To transfer the IP packet over the packet switched network 164 even the IP packet is sent within other packets.

The status information and/or control signals that are being transferred form the RTP payload. The RTP header contains information related to the payload (e.g., the source, size, encoding type, etc.). RTP has traditionally been used to carry data with real-time characteristics, such as interactive video and audio data. However, in accordance with embodiments of the present invention, the RTP payload may include status information relating to, for example, the status of a contact center 100. Of course, some status information may be included in the RTP header or in a packet trailer. Additionally, control signals may be included in the RTP payload, header, or trailer. The status information and control signals may be transmitted in different packets or may be combined and sent in a common packet.

RTP does not guarantee delivery of packets in order. Although RTP does not guarantee packet delivery in order, the protocols do deliver the necessary information to make sure the received packets can be reassembled in the correct order. Additionally, RTP provides information about reception quality, which can be used to make local adjustments if all of the status information and/or control signals are not being received (e.g., the data rate could be lowered). The RTP header structure also carries information such as the RTP version being used, a padding bit, an extension bit, a CSRC Count that contains the number of CSRC identifiers that follow the fixed header, a marker bit, a payload type that identifies the format (e.g., encoding) of the RTP payload, sequence number information that defines the packet number as it related to other packets, timestamp information, and other identifiers of the synchronization and contributing sources. The RTP header information is used to reassemble the RTP payload on the receiving end. Sometimes the order of the data is important and therefore orderly reassembly of the packets is required to generate the status information and/or control signals. In alternative embodiments, status information and/or control signals do not have a specifically required order of delivery and for that reason may not require an orderly reassembly of packets.

In alternative embodiments, the RTP payload may include voice and/or video information in combination with the status information and/or control signals. Still further in the alternative, status packets or control packets may be inserted into an RTP media stream. A portion of packets in the media stream may include typical data transmitted using RTP such as real-time audio and video data. Another portion of packets in the media stream may exclusively contain status information and/or control signals. The packets with status information and/or control signals may have a flag or similar type of identifier in the RTP header indicating that the packet contains the status information. Alternatively, all media packets may contain the flag and the lack of a flag in the header may indicate that the packet contains status information and/or control signals. The packets identified as containing status information and/or control signals may be treated separately by the receiving server than those packets which are not identified as containing status information and/or control signals.

The actual status information and/or control signals are transformed into binary data and transferred as such within the RTP payload. By sending binary status information and/or control signals using RTP, status information and/or control signals can be "tunneled" to the destination without worrying about all of the issues associated with maintaining encrypted socket connections. Furthermore, the "conference" capability of the connection can be exploited to jointly share status information and/or control signals between a group without requiring the specific point-to-point connections and messaging normally required.

Figure 4:
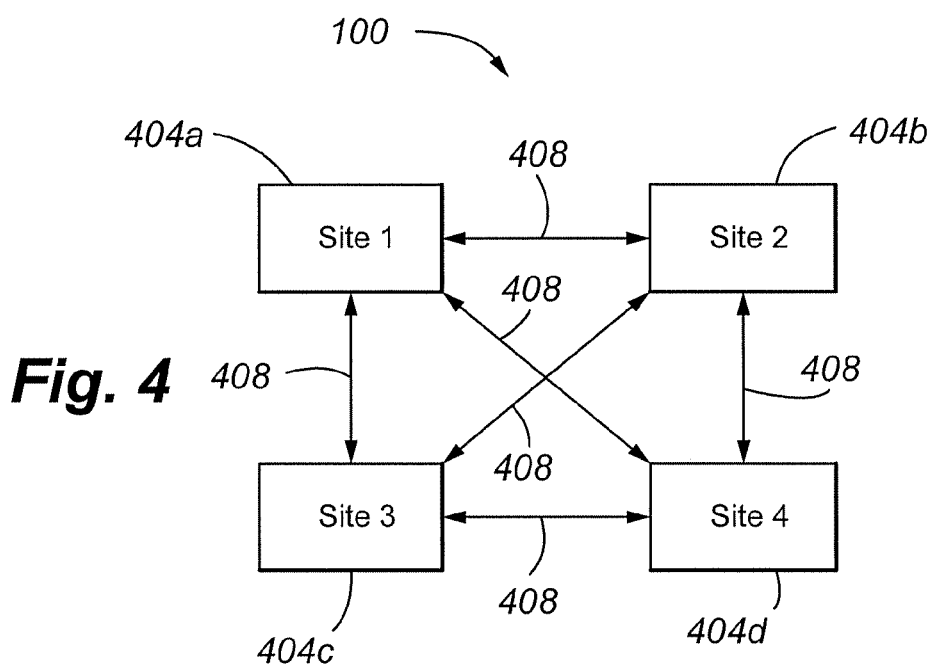
FIG. 4 is a block diagram depicting a fully distributed multiple site contact center in accordance with embodiments of the present invention.

FIG. 4 depicts a fully distributed multiple site contact center 100 in accordance with at least some embodiments of the present invention. The distributed contact center 100 generally includes a first site 404a, second site 404b, third site 404c, and a fourth site 404d. Each site is connected by a dedicated connection 408. In an alternative embodiment, the sites 404 may be conferenced together through a conferencing platform or through a site having such hardware. Although depicted as only four sites 404, the distributed contact center 100 may include a greater or lesser number of sites 404 depending upon the enterprise and the volume on contacts that need to be handled by the contact center 100. Each site 404 may be physically separated from all other sites in one embodiment. The distance between sites 404 may be between a few feet and hundreds of miles. An advantage to implementing a fully distributed contact center 100 is that status information can be maintained at multiple sites thus eliminating a single point of failure. If one site 404 is subject to a power outage or natural disaster, the additional sites 404 can continue to operate and absorb the work volume from the failed site 404. If the failed site 404 is eventually brought back online, the site 404 can be conferenced back in with the other sites 404 and workflow can be sent back to the newly added site 404.

Figure 5:
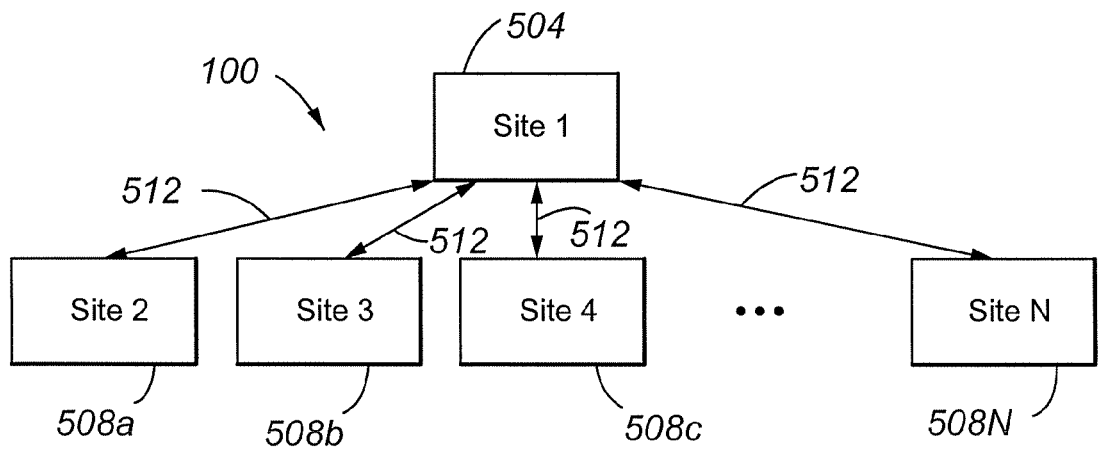
FIG. 5 is a block diagram depicting a centralized multiple site contact center in accordance with embodiments of the present invention.

Referring now to FIG. 5, a centralized multiple site contact center 100 will be described in accordance with at least some embodiments of the present invention. The centralized multiple site contact center 100 generally comprises a central site 504 connected to a number of remote sites 508a-N, where N is generally greater than or equal to one. Each of the remote sites are connected to the central site 504 through a separate line 512. In one embodiment, each connection 512 represents a separate RTP data stream.

In one embodiment, the central site 504 includes all of the resources, including the ACD, of a typical contact center. The central site 504 receives status information from all of the remote sites 508 and distributes the workflow of the contact center 100 between all sites 504, 508 using control signals. Agent, skill, queue, and another other pertinent information is maintained at the central site 504 for all of the sites 504, 508 in the contact center 100. In such an embodiment, the remote sites 508 may be equipped with additional ACD resources to further manage workflow within the site 508, but such resources are not required. Rather, the remote sites 508 may simply include contact processing resources such as agents, agent communication devices 134, 138, and an IVR, 122. Other portions of the a typical contact center 100 may be maintained at the central site 504 thus reducing the capital required to run all of the sites 504, 508.

Figure 6:
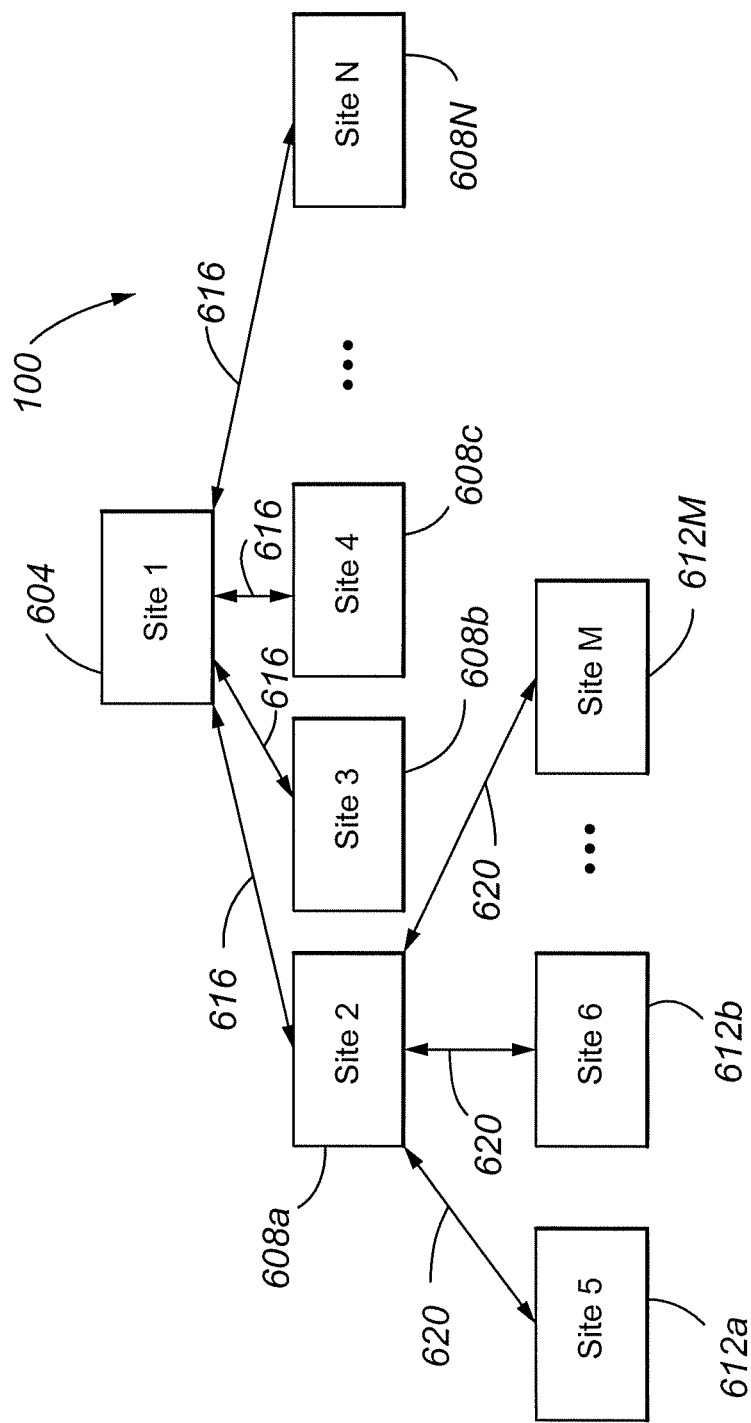
FIG. 6 is a block diagram depicting a hierarchical multiple site contact center in accordance with embodiments of the present invention.

FIG. 6 depicts a hierarchical multiple site contact center 100 in accordance with at least some embodiments of the present invention. The hierarchical multiple site contact center 100 may generally include a highest level site 604, a number of second level sites 608a-N, and a number of third level sites 608a-M. The highest level site 604 is similar to the central site 504 described above in that it is connected to a number of second level sites 608a-N individually through separate connections 616. Each connection 616 represents a different RTP data stream. Similarly, one or more of the second level sites 608 may be a central site to a number of third level sites 612a-M. The third level sites 608 may be connected to the second level site 608 through dedicated connections 620, which also represent individual RTP data streams. Although only three levels of sites are depicted, one skilled in the art will appreciate that a greater or lesser number of levels may be employed. Additionally, more than one site on lower levels of the hierarchy may be connected to multiple remote sites.

In accordance with one embodiment of the present invention, the types of data transferred between sites may vary upon the level of each site in the hierarchy. For example, the types of data transferred at the lowest levels of the hierarchy may be the most granular. In other words, the most detailed status information may be transferred between the third level sites 612 and the second level sites 608. Detailed status information may include individual agent status, individual agent efficiency, individual skill information, or the like. Less granular information may be transmitted between the second level sites 608 and the highest level site 604. Information that is less detailed may include agent queue information (e.g., number of idle agents, number of busy agents, average idle time), contact queue information (e.g., too long of wait times, adequate wait times, etc.), overall contact center performance information (e.g., match rate, queue service level, agent utilization, and so on), server status information (e.g., operational mode, standby mode, failed, about to fail, etc.), and the like. Such higher level data may be used at the higher level site 604 to manage workflow between all of the sites 604, 608, 612. As can be appreciated, there may be more than one highest level site 604 provided in the hierarchical multiple site contact center 100.

Dividing the sites into hierarchical levels may provide for a logical way of distributing management responsibilities. The lower level sites may only be required to manage agent performance whereas the higher level sites may be more concerned with managing contact center performance parameters. The use of RTP to transfer any type of status information between sites allows this distributed management of the contact center 100 to be performed more easily and efficiently.

Figure 7:
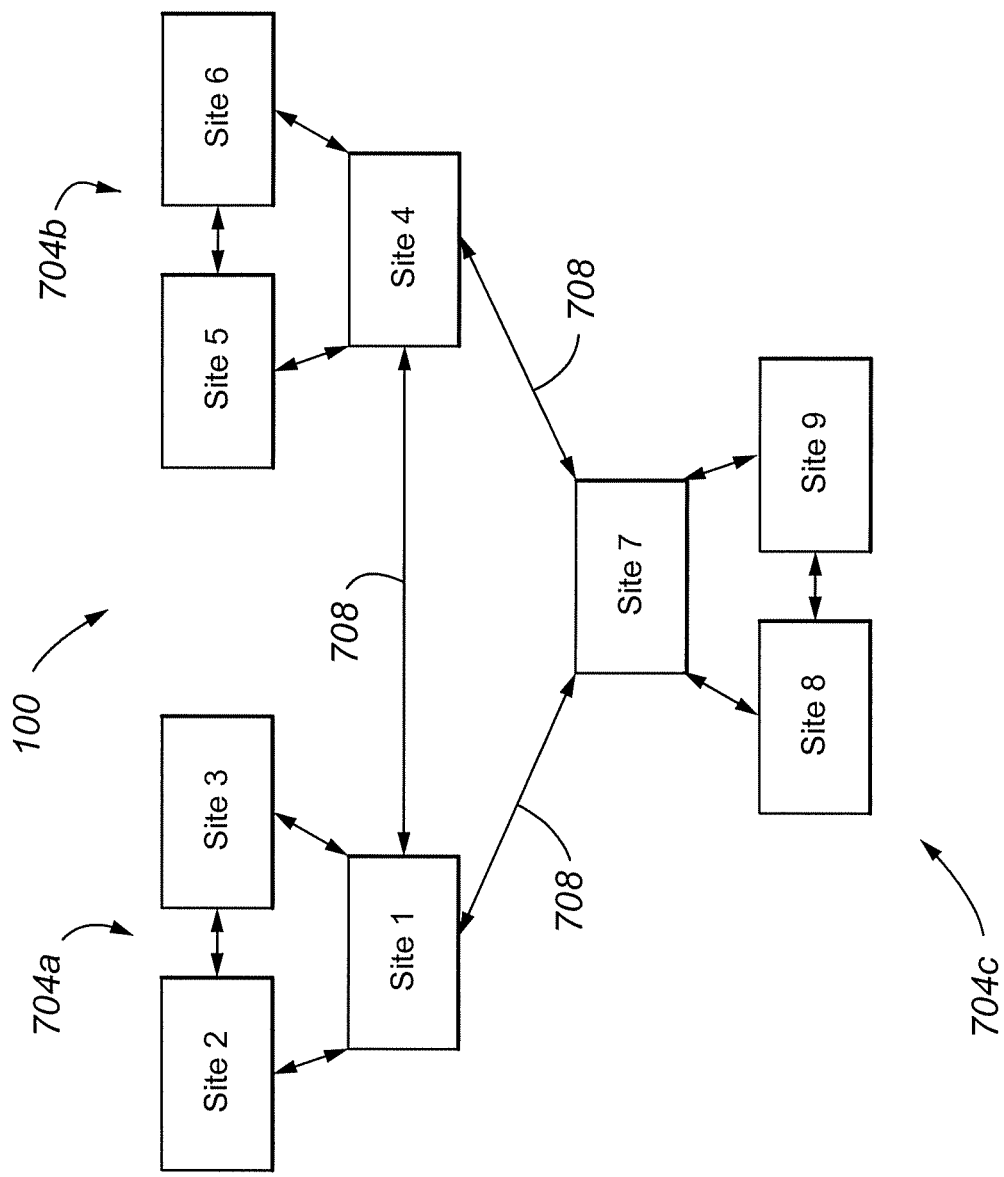
FIG. 7 is a block diagram depicting a distributed group multiple site contact center in accordance with embodiments of the present invention.

With reference now to FIG. 7 a distributed group multiple site contact center 100 will be described in accordance with at least some embodiments of the present invention. The distributed group multiple site contact center 100 provides a number of site groups 704. Each site group 704 is in communication with other site groups 704 via connections 708. Networking theory suggests that a particular endpoint (such as a site) in a network only needs to be connected to four other endpoints to fully distribute information throughout the network. For example, a first network group 704a consisting of just three sites can be connected to a second network group 704b and a third network group 704c and all information between all sites can be disseminated throughout the contact center 100. In one embodiment, the connections within a group as well as between groups 708 can be initially created using a SIP protocol. After initialization, a RTP stream can be established between endpoints thus facilitating the transfer of status information.

Figure 8:
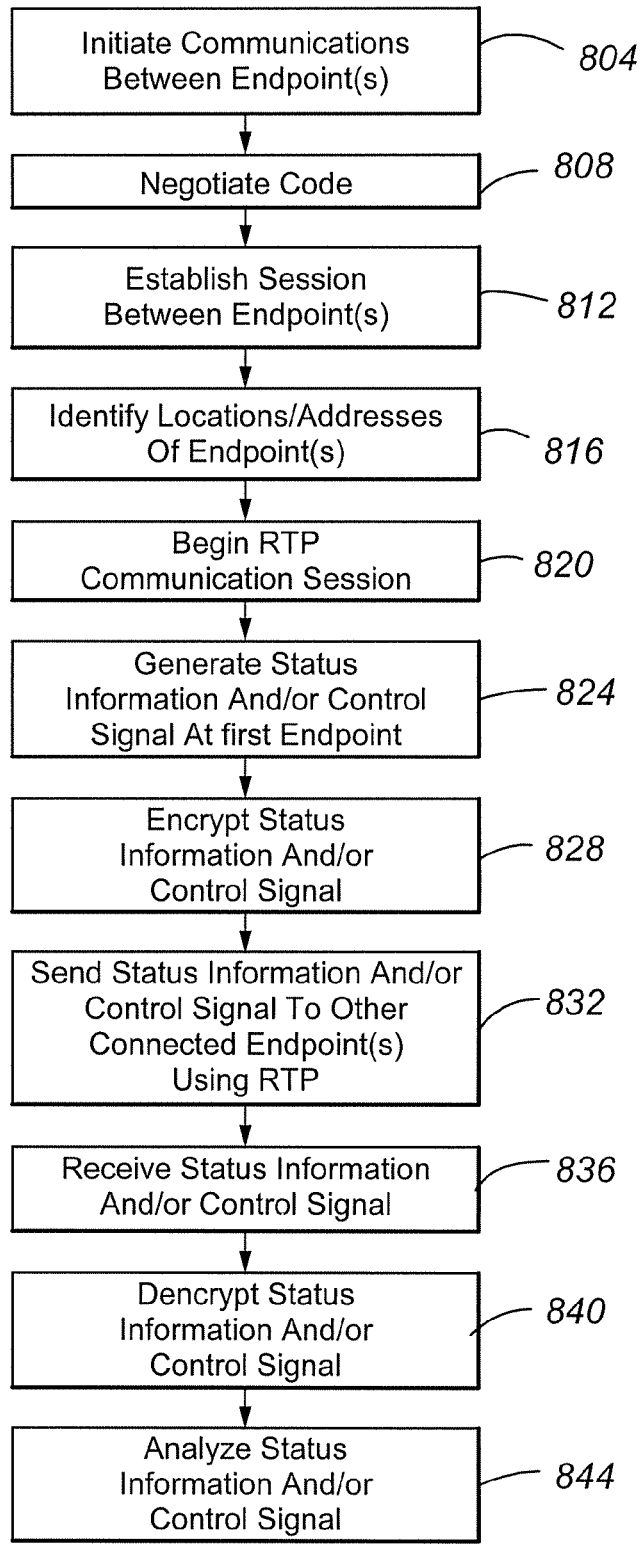
FIG. 8 is a flow diagram depicting a method of transferring status information between separated endpoints in accordance with embodiments of the present invention.

FIG. 8 depicts a method of communicating status information using an RTP protocol in accordance with embodiments of the present invention. The method begins when at least two endpoints initiate communication (step 804). An endpoint as used herein can include different contact center sites, different sites of different contact centers, different servers at different sites, different servers at the same site, different communication devices at different sites, different communication devices at the same site, or external communication devices. The communications may be initiated using, for example, SIP. As a part of the initiation process the endpoints may negotiate a codec for use during data transmission (step 808). The codec agreed upon is typically supported by both endpoints. However, in certain embodiments, different codecs can be used if such codecs are compatible with one another. In a preferred embodiment, a lossless codec is employed such that little to no data is lost as a part of the compression algorithm. Examples of such a codec include FLAC and other customized codecs.

Once the codecs have been agreed upon by both endpoints, a communication session is established between the endpoints (step 812). With the session established, each endpoint can identify the locations/addresses of the other endpoint with which it is communicating (step 816). The address generally corresponds to a Uniform Resource Identifier (URI) in the form of an IP address, email address, extension, or the like. When each endpoint knows the destination address of all other participants, the endpoints can begin an RTP communication session (step 820). Using RTP allows status information and/or control signals to be tunneled from one particular endpoint to another endpoint without requiring use of slow, unsecured, or lossy protocols. The RTP communication can be a streaming and real-time communication session where status information and/or control signals are transferred between endpoints. An additional feature supported by RTP is the fact that Quality of Service (QoS) can be measured and monitored with respect to the communication session.

As a part of the RTP communication session a first endpoint may begin generating status information and/or control signals that it will send to the other endpoint(s) (step 824). In one embodiment, the status information and/or control signals are packetized and formatted for transmission as an RTP payload. As a further feature, the entire RTP payload can be encrypted according to an agreed upon encryption scheme (step 828). The encryption scheme may be symmetric or asymmetric depending upon security and implementation concerns.

After the RTP payload has been encrypted, the RTP header corresponding to the payload is generated and sent as a part of a UDP header to all connected endpoints (step 832). The packet is received by the destination endpoint and the payload is analyzed and removed using the header information (step 836). Thereafter, the receiving endpoint decrypts the status information and/or control signals contained in the payload according to the encryption scheme employed (step 840). Once the status information is decrypted it may be analyzed to determine what the status of the other endpoint was when the status information was sent (step 844). In an alternative embodiment, the status information may be combined with other packets of status information using the RTP headers prior to analysis. Additionally, as noted above, status information may be included in the RTP header or a packet trailer. The header may also include a flag indicating that the RTP packet contains status information. Alternatively, or in combination, if control signals were sent, the control signals from each packet may be combined and analyzed at the receiving endpoint to determine what resource will receive the control signal.

Figure 9:
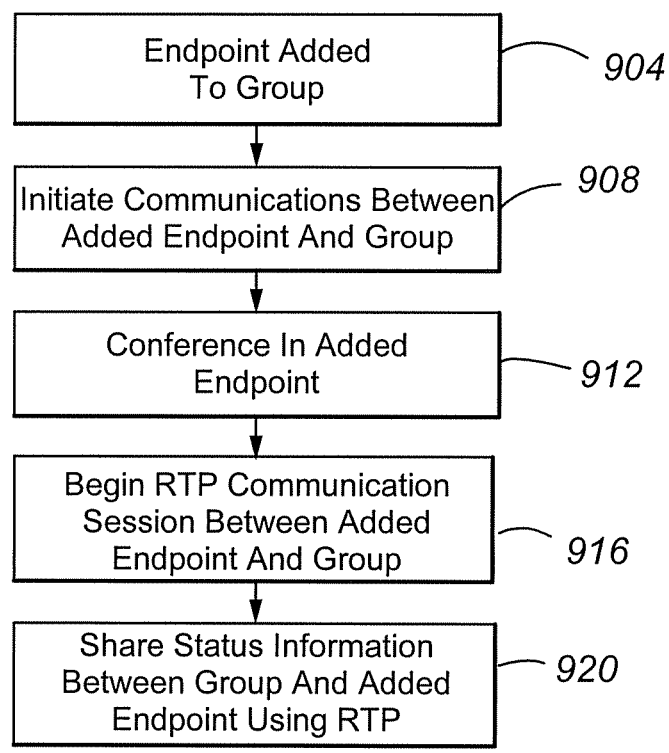
FIG. 9 is a flow diagram depicting a method of adding additional endpoints to a group of endpoints in accordance with embodiments of the present invention.

Referring now to FIG. 9, a method of adding an endpoint to a group already sharing status information and/or control signals will be described in accordance with at least some embodiments of the present invention. The method begins when it is determined that a new endpoint will be added to a group already sharing status information and/or control signals (step 904). Thereafter, communications are initiated between the endpoint being added and at least one of the other endpoints of the group (step 908). As noted above, the communication initiation may be performed using SIP. Once the endpoint has initiated communications and identified the addresses of the endpoint(s) that it will be communicating with the group, the endpoint is conferenced into the group communication session (step 912). This may mean that the endpoint is only communicating with one other endpoint or this may mean that the added endpoint is conferenced in and communicating with all other endpoints in the group.

After the new endpoint has been added to the conference, it may begin RTP communications with the endpoints of the group (step 916). Using RTP, the new endpoint can then send status information and/or control signals to endpoints in the group and endpoints in the group can send status information and/or control signals to the added endpoint (step 920).

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   connecting at least two contact center site endpoints together;
   establishing a Real-Time Protocol (RTP) stream between the at least two contact center site endpoints;
   accessing at least one of real time status information and control signals from a first of the at least two contact center site endpoints, the real time status information and control signals each being other than audio or video content; and
   transferring, using the RTP stream, the accessed at least one of the real time status information and the control signals from the first of the at least two contact center site endpoints to a second of the at least two contact center site endpoints.

2. The method of claim 1, wherein the real time status information further comprises at least one of contact center agent information, queue information, skill information, server information, network information, system information, process flow information, and control information.

3. The method of claim 1, wherein transferring the accessed at least one of the real time status information and the control signals comprise packetizing the accessed at least one of the real time status information and the control signals and formatting the packets for transmission as an RTP payload.

4. The method of claim 3, further comprising generating an RTP header describing the RTP payload.

5. The method of claim 1, wherein connecting the at least two contact center site endpoints together comprises employing Session Initiation Protocol (SIP).

6. The method of claim 1, further comprising encrypting the accessed at least one of the real time status information and the control signals prior to transmitting the accessed at least one of the real time status information and the control signals.

7. The method of claim 6, further comprising:
   receiving the accessed at least one of the real time status information and the control signals at the second contact center site endpoint;
   decrypting the accessed at least one of the real time status information and the control signals; and
   analyzing the decrypted at least one of the real time status information and the control signals.

8. The method of claim 1, wherein the first contact center site endpoint comprises a first call center site having a first set of resources and the second contact center site endpoint comprises a second call center site having a second different set of resources.

9. The method of claim 1, wherein the at least two contact center site endpoints comprise at least one of different sites of different contact centers, different servers at different sites, different servers at the same site, different communication devices at different sites, different communication devices at the same site, or external communication devices.

10. The method of claim 1, further comprising conferencing at least one of the first and second contact center site endpoints.

11. The method of claim 10, further comprising conferencing a third contact center site endpoint to at least one of the first and second contact center site endpoints.

12. The method of claim 1, wherein the RTP stream comprises a data stream supported by a protocol formatted for delivering audio and/or video information over a packet switched network.

13. A non-transitory computer readable medium comprising executable instructions for performing the method of claim 1.

14. In a multiple site contact center, comprising a plurality of agents for servicing contacts, a method comprising:
   connecting a first contact center site endpoint having a first set of resources to a second contact center site endpoint having a second set of resources;
   establishing a data tunnel between the first contact center site endpoint and the second contact center site endpoint;
   accessing at least one of a real time status information and a control signal from the first contact center site endpoint, the real time status information and control signal each being other than audio or video content; and
   transferring, using a Real Time Protocol (RTP) stream, the accessed at least one of the real time status information and the control signal from the first contact center site endpoint to the second contact center site endpoint.

15. The method of claim 14, wherein the real time status information further comprises at least one of contact center agent information, queue information, skill information, server information, network information, system information, process flow information, and control information.

16. The method of claim 14, wherein at least one of the first and second sets of resources comprise contact distribution devices.

17. The method of claim 14, wherein transferring the accessed at least one of real time status information and the control signal comprises packetizing at least one of the real time status information and the control signal and formatting the packets for transmission as a Real-time Transfer Protocol (RTP) payload.

18. The method of claim 17, further comprising generating an RTP header describing the RTP payload.

19. The method of claim 14, wherein connecting the first and second contact center site endpoints together comprises employing Session Initiation Protocol (SIP).

20. A non-transitory computer readable medium comprising executable instructions for performing the method of claim 14.

21. A communication endpoint, comprising:
   a first contact center site;
   at least one of a generator and a consumer of at least one of a real time status information and a control signal from the generator, the real time status information and control signal each being other than audio or video content; and
   at least one of a transmitter for transmitting and a receiver for receiving a Real-time Transfer Protocol (RTP) stream containing the at least one of the real time status information and the control signal, to or from a second communication endpoint comprising a second contact center site.

22. The endpoint of claim 21, wherein the communication endpoint is associated with the first contact center site having a first set of resources and wherein the second communication endpoint is associated with the second contact center site having a second different set of resources.

23. The communication endpoint of claim 22, wherein the real time status information further comprises at least one of contact center agent information, queue information, skill information, server information, network information, system information, process flow information, and control information.

24. The communication endpoint of claim 22, further comprising at least a third contact center site having a third set of resources.

25. The endpoint of claim 24, wherein the first, second, and at least a third contact center sites are distributed.

26. The communication endpoint of claim 24, wherein the first, second, and at least a third contact center sites are configured in a centralized fashion.

* * * * *